United States Patent
Reddy

(10) Patent No.: US 12,518,396 B2
(45) Date of Patent: Jan. 6, 2026

(54) BACKGROUND-PIXEL-BASED IMAGE SEGMENTATION

(71) Applicant: Oracle International Corporation, Redwood Shores, CA (US)

(72) Inventor: Vikram Majjiga Reddy, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 249 days.

(21) Appl. No.: 18/300,621

(22) Filed: Apr. 14, 2023

(65) Prior Publication Data

US 2024/0346662 A1    Oct. 17, 2024

(51) Int. Cl.
*G06T 7/194* (2017.01)
*G06T 7/90* (2017.01)
*G06V 10/762* (2022.01)
*G06V 10/764* (2022.01)

(52) U.S. Cl.
CPC .......... *G06T 7/194* (2017.01); *G06T 7/90* (2017.01); *G06V 10/762* (2022.01); *G06V 10/764* (2022.01); *G06T 2207/10024* (2013.01); *G06T 2207/30176* (2013.01)

(58) Field of Classification Search
CPC . G06T 7/194; G06T 7/90; G06T 2207/10024; G06T 2207/30176; G06V 10/762764; G06V 30/00–43; G06V 10/762; G06V 10/764
See application file for complete search history.

(56) References Cited

U.S. PATENT DOCUMENTS

| | | | |
|---|---|---|---|
| 5,613,017 A * | 3/1997 | Rao | G06T 3/04 358/1.11 |
| 6,323,876 B1 * | 11/2001 | Rao | H04N 1/3872 358/452 |
| 6,449,391 B1 * | 9/2002 | Ku | G06V 30/162 358/463 |
| 2010/0040287 A1 * | 2/2010 | Jain | G06V 30/414 382/177 |
| 2011/0137898 A1 | 6/2011 | Gordo et al. | |
| 2011/0271177 A1 * | 11/2011 | Bastos dos Santos | G06F 40/174 715/256 |
| 2012/0274991 A1 * | 11/2012 | Roy | H04N 1/40062 382/164 |
| 2015/0281513 A1 * | 10/2015 | Ozawa | H04N 1/3878 358/474 |

(Continued)

*Primary Examiner* — Sean T Motsinger
(74) *Attorney, Agent, or Firm* — Invoke

(57) ABSTRACT

Techniques for segmenting an electronic document based on identifying background regions within the document are disclosed. A system identifies foreground regions—such as regions containing text and graphics—in an electronic document by clustering background regions of the document to determine the boundaries of the remaining regions. The system identifies the remaining regions as foreground regions, without requiring an analysis of distances between the foreground regions and without requiring an analysis of the semantic content in these regions. The system clusters the background regions by identifying horizontal slices of content (content slices) and non-content slices, generating a binary representation of the content slices, and clustering background regions within each content slice based on the binary representations.

22 Claims, 12 Drawing Sheets

(56) References Cited

U.S. PATENT DOCUMENTS

| | | | |
|---|---|---|---|
| 2016/0180163 A1* | 6/2016 | Ming | G06V 30/40 |
| | | | 382/164 |
| 2020/0394397 A1* | 12/2020 | Li | G06V 30/416 |
| 2022/0012483 A1* | 1/2022 | Li | G06V 30/413 |
| 2022/0036063 A1* | 2/2022 | Bhuyan | G06V 30/416 |
| 2022/0300735 A1 | 9/2022 | Kelly et al. | |

* cited by examiner

FIG. 3B

| | |
|---|---|
| 302 / 301 | Rapid GRAPHICS *Artistcare* TAX INVOICE |
| 302 / 301 | Rapid Graphics Pty Ltd trading as RAPID GRAPHICS<br>Rapid Graphics Pty Ltd trading as ARTISTCARE Qld<br>A.C.N. 010 556 068  A.B.N. 51 010 556 067<br>Phone: (07) 3868 3700  Fax (07) 3368 3965  Invoice No:  RA007608 |
| 302 / 301 | STREET ADDRESS:  POSTAL ADDRESS:<br>Milton, Qld 4064  Milton, Qld 4064  Date:  16/02/01 |
| 302 / 301 | Invoice to:  Deliver to: |
| 302 / 301 | XYZ Recreation Inc.  XYZ Recreation Inc. |
| 302 / 301 | Coronation Inc.  Coronation Inc. |
| 302 / 301 | Tarinaa  Tarinaa |
| 302 / 301 | Account Number | Customer Order No / Reference | Trading Terms | Delivery Dkt No |
| 302 / 301 | 903185 | 4495-BRUCE | 7 DAYS | 81301 |

FIG. 3G

BACKGROUND-PIXEL-BASED IMAGE SEGMENTATION

TECHNICAL FIELD

The present disclosure relates to identifying foreground regions in an electronic document by grouping background regions. In particular, the present disclosure relates to identifying foreground regions from identified background regions in an electronic document by analyzing rows of pixels and columns of content rows to identify and cluster the background regions.

BACKGROUND

Enterprises utilize machine learning models to extract content from vast quantities of documents. For example, an enterprise may wish to identify, from among a set of invoices, every transaction from a particular supplier. To do so, a system must be able to locate the portion in the document header that includes supplier information. However, different suppliers may locate their information at different locations and with different characteristics in a header. For example, in one invoice, the recipient information may be located immediately above the supplier information. In another invoice, the recipient information may be located on an opposite side of a page from the supplier information. Font types, spacing, text box locations, and text box shapes may vary from one supplier to another. Before a machine learning model can classify a set of documents, a system must be able to identify where relevant data for classification is located in the document.

Models and algorithms group content in a document together by analyzing text attributes such as text characteristics and text positions to determine whether one set of text is related to another set of text. Due to the many different types of formats that exist in documents, existing models and algorithms have difficulty identifying related content that should be grouped within a document, and particularly within document headers.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 3A-3G illustrate an example embodiment; and

DETAILED DESCRIPTION

Figure 1:
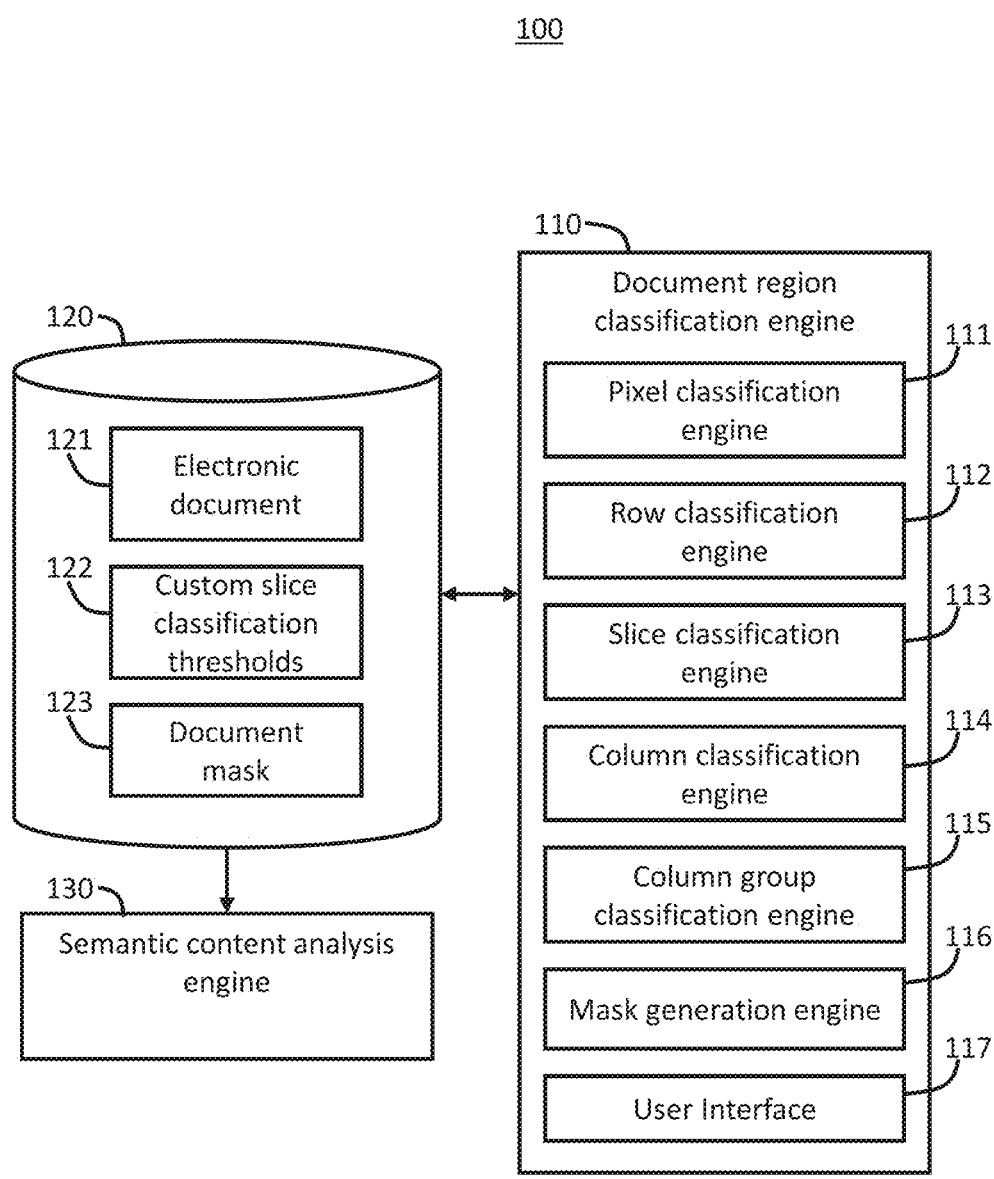
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. CLUSTERING BACKGROUND CONTENT IN A DOCUMENT TO IDENTIFY FOREGROUND REGIONS
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

A system identifies foreground regions—such as regions containing text and graphics—in an electronic document by clustering background regions of the document to determine the boundaries of the remaining regions. The system identifies the remaining regions as foreground regions, without requiring an analysis of distances between the foreground regions and without requiring an analysis the semantic content in these regions. The system clusters the background regions by identifying horizontal slices of content (content slices) and non-content slices, generating a binary representation of the content slices, and clustering background regions within each content slice based on the binary representations.

One or more embodiments obtain a background projection profile to differentiate between background pixels and foreground pixels in an electronic document. For example, the system may calculate average pixel values in an entire electronic document to identify a threshold value corresponding to a value of a background pixel. The system labels the pixels in the electronic document as foreground pixels or background pixels based on comparing the pixel values to the threshold. The system obtains a different background projection profile for different documents to provide accurate classification of foreground regions for documents with different shades of background pixels. For example, a document with a white background and gray text has a different background projection profile than a document with a gray background and black text.

One or more embodiments classify sets of rows of pixels as content slices or non-content slices based on grouping the sets of rows of pixels according to how many background pixels are in each the rows of pixels. The system differentiates between content rows of pixels and non-content rows of pixels by comparing the percentage of background pixels in rows of pixels to a threshold. For example, a system may label a row of pixels as a non-content row of pixels based on determining at least 95% of the pixels in the row are background pixels. The system groups a set of adjacent rows of pixels classified as content rows into a content slice.

One or more embodiments generate a binary representation of each content slice by assigning a binary value to each column of pixels in each content row. Specifically, for a content slice, the system identifies vertical columns of pixels in which a percentage of background pixels exceeds a threshold. The system assigns a binary value, 1 or 0, to a column based on whether the percentage of background pixels in the column exceeds the threshold. The result is a binary encoding of each content slice.

One or more embodiments calculate, for each content slice, a classification threshold for classifying groups of adjacent background columns, or non-content columns (columns for which a percentage of background pixels exceeds a threshold). For each group of non-content columns bounded on horizontal sides by a content column, the system calculates a number of non-content columns in the group. For a content slice, the system calculates the mean of the number of non-content columns in each group. The system calculates a normal distribution for the content slice. The system compares each group of adjacent non-content columns to the normal distribution. The system classifies a group as "significant" or "insignificant" based on whether the number of columns in the group exceeds a particular standard deviation from the mean. The system identifies boundaries of content regions based on the significant groups of non-content columns. The system identifies the insignificant groups of background columns as spaces between characters, words, or portions of images. The system considers these groups to be part of the content regions and disregards these groups when identifying boundaries of the content regions.

In one or more embodiments, the system clusters background regions and foreground regions in the electronic document by grouping (a) "significant" non-content groups in each content slice, and (b) non-content slices between content slices. The system identifies the boundaries of foreground regions by identifying the boundaries of the background clusters. For example, in a header of an invoice document, the system may perform the above process to identify one single supercluster of background regions comprising non-content slices between content slices, and "significant" non-content groups within the content slices.

One or more embodiments obtain coordinate data of the boundaries of the foreground regions. The system maps the coordinate data to the electronic document to identify the foreground regions in the electronic document. The system may then extract semantic content from the identified foreground regions.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a document region classification engine 110, a data repository 120, and a semantic content analysis engine 130. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 5, titled "Computer Networks and Cloud Networks."

The document region classification engine 110 classifies regions within an electronic document as foreground regions or background regions. The document region classification engine 110 stores a document mask 123 identifying the foreground regions in the electronic document 121. The semantic content analysis engine 130 obtains the electronic document 121 and the document mask 123 to extract semantic content from the identified foreground regions in the electronic document 121.

The document region classification engine 110 includes a pixel classification engine 111 to classify pixels in an electronic document 121 as background pixels and foreground pixels. For example, the pixel classification engine 111 may convert grayscale or color documents into black and white documents, where white represents a background pixel and black represents a foreground pixel. The pixel classification engine 111 may identify an average shading value of all the pixels in a document, or in a portion of a document. The pixel classification engine 111 may compare each pixel to the average to identify the pixel as a foreground pixel or a background pixel. According to another example, the pixel classification engine 111 may convert an electronic document 121 into grayscale by averaging the red, green, and blue color channels. The pixel classification engine 111 may convert the resulting grayscale image into a black-and-white image by comparing the grayscale values for the pixels to threshold values. Accordingly, while one electronic document 121 is illustrated in FIG. 1, the pixel classification engine 111 calculates different threshold values for different electronic documents for classifying pixels as background pixels or foreground pixels. For example, in an electronic document with a gray-shaded background, the threshold for classifying a pixel as a background pixel is darker than for an electronic document with a white background.

A row classification engine 112 analyzes rows of pixels in the electronic document 121 to identify the rows as content rows or non-content rows. The row of pixels includes all the pixels extending from the left edge of the electronic document 121 to the right edge of the electronic document 121. In an example in which a document is aligned for reading, the row extends from a left edge of the document to the right edge of the document. The row classification engine 112 compares a percentage of background pixels in each row of pixels to a threshold value. For example, the threshold value may be set at 95%. In this example, if a percentage of background pixels within the row of pixels is 95% or more, the row classification engine 112 classifies the row as a non-content row. If a percentage of background pixels within the row of pixels is less than 95%, the row classification engine 112 classifies the row as a content row. The row classification engine 112 iteratively classifies rows of pixels as content rows and non-content rows until each row in a predefined portion of an electronic document 121 has been classified. For example, the row classification engine 112 may classify each row in the entire electronic document 121. Alternatively, the row classification engine 112 may classify each row in a portion of the electronic document 121 identified as a header of the electronic document 121.

A slice classification engine 113 classifies sets of rows of pixels as horizontal content slices or horizontal non-content slices. The slice classification engine 113 identifies sets of one or more rows that are either (a) bordered on both a top and a bottom by rows of an opposing type, or (b) bordered on the top and bottom by an edge of the document and a row of an opposing type. The slice classification engine 113 sequentially analyzes each horizontal row of pixels in a direction from a top of a document to a bottom of a document, or from the bottom of the document to the top of the document. If a row is of a same type (content/non-content) as the previously-analyzed row, the slice classification engine 113 groups the rows in the same horizontal slice. If a row is of a different type from the previously-analyzed row, the slice classification engine 113 identifies the edge of the previously-analyzed slice and a new edge of a new slice. The slice classification engine 113 analyzes sets of rows until each row has been analyzed. As a result, an electronic document 121, or a portion of an electronic document 121, is divided into alternating horizontal slices of content slices and non-content slices, where each slice comprises one or more horizontal rows of pixels that are classified as content rows or non-content rows, respectively.

A column classification engine 114 classifies columns of each horizontal content slice as content columns or non-content columns. According to one embodiment, the column classification engine 114 does not classify columns of non-content slices. The column classification engine 114 assigns a binary value to each column corresponding to the content/non-content classification. As a result, each content slice in the electronic document 121 is represented as a binary string. For each column, the column classification engine 114 determines whether a percentage of pixels in the column meets a threshold. In one embodiment, the column classification engine calculates an average background pixel percentage across all columns in a horizontal slice. Accordingly, the threshold may vary by horizontal slice, depending upon the respective average background pixels percentages of the respective horizontal slices. According to one embodiment, the threshold for classifying a column as a non-content column is much smaller than the threshold used to classify a row of pixels as a non-content row. For example, the row classification engine 112 may classify a row as a non-content row based on determining the percentage of background pixels in the row is 97% or greater. In contrast, the column classification engine 114 may classify a column of a content slice as a non-content column based on determining the percentage of background pixels in the column is 70% or greater. In one or more embodiments, the threshold for classifying a column of pixels of a content slice as a non-content column is at least 10% lower than the threshold for classifying a row of pixels as a non-content row. As a result of the relatively lower threshold for classifying columns of pixels in a content slice as non-content columns, the column classification engine 114 classifies small spaces between text characters and/or between graphics as non-content columns. As an example, the column classification engine 114 may determine that the average percentage of background pixels per column in a particular content slice is 70%. The column classification engine 114 classifies columns in the column slice as content/non-content columns based on determining whether the columns include at least 70% background pixels. In another content slice in the same electronic document, the column classification engine 114 may determine that the average percentage of background pixels per column is 50%. The column classification engine 114 classifies columns in the column slice as content/non-content columns based on determining whether the columns include at least 50% background pixels. Accordingly, the column classification engine 114 calculates a different threshold for each content slice for classifying columns in the respective slice as a content column or a non-content column. In addition, the thresholds are less than thresholds for classifying rows of pixels as non-content rows.

The column classification engine 114 classifies each column in a content slice as a content column or a non-content column until each column in the slice has been classified. The column classification engine 114 classifies each column in each content slice of the electronic document 121 as a content column or a non-content column.

The column classification engine 114 assigns a binary value to a column of pixels based on whether the column is classified as a content column or a non-content column. For example, the column classification engine 114 may assign a "1" to a column classified as a content column and a "0" to a column classified as a non-content column. As a result, each content slice may be represented as a binary string. For example, a portion of a content slice which includes five adjacent non-content columns, ten adjacent content columns, one non-content column, then two content columns, may be represented as: " . . . 0, 0, 0, 0, 0, 1, 1, 1, 1, 1, 1, 1, 1, 1, 1, 0, 1, 1, . . . "

In each horizontal content slice, the column group classification engine 115 analyzes groups of adjacent non-content columns to classify the groups as "significant" or "insignificant." The column group classification engine 115 stores the "significant" groups of non-content columns as clusters. The column group classification engine 115 refrains from storing the "insignificant" groups of non-content columns as clusters. In particular, the column group classification engine 115 selects a particular set of adjacent non-content columns (Operation 250). For example, a portion of a content slice may be represented by a binary string: 0, 0, 0, 0, 1, 1, 1, 1, 1, 1, 1, 1, 0, 1, 1, 1, 1, 1, 1, 0, 1, 1, 1, 1, 1, 1, 0, 0, 0, 0, 1, 1, . . . . The column group classification engine 115 selects for analysis four sets of adjacent, or single, non-content columns: a four-columns set (0, 0, 0, 0), a single column set (0), a single column set (0), and a four-column set (0, 0, 0, 0). The column group classification engine 115 determines whether the set of non-content columns meets a threshold. If a number or percentage of non-content columns in the selected set meets the threshold, the column group classification engine 115 classifies the group of columns as "significant" and stores the group as a distinct cluster. If a number or percentage of non-content columns in the selected set does not meet the threshold, the column group classification engine 115 classifies the grouping as "insignificant" and refrains from storing the grouping as a distinct cluster.

According to one embodiment, the column group classification engine 115 sets custom slice classification thresholds 122 for each content slice according to characteristics of the respective content slice. For example, the column group classification engine 115 may assign one threshold to one content slice characterized by one pattern of non-content columns. The system assigns a different threshold to another content slice characterized by another pattern of non-content columns. The column group classification engine 115 assigns a particular threshold to a particular content slice by (a) generating a set of values corresponding to numbers of columns in each set of adjacent non-content columns, or solitary non-content columns surrounded by content columns, in a content slice, (b) calculating a mean of the set of values, (c) fitting a normal distribution on the set of values, and (d) selecting a threshold for a content slice based on the normal distribution. For example, the column group classification engine 115 may select a threshold for a content slice based on one standard deviation from the mean. Alternatively, the column group classification engine 115 may select a threshold for a content slice based on two standard deviations from the mean. Since two content slices may have different mean values for non-content groupings, the column group classification engine 115 assigns different custom thresholds to different content slices for classifying groups of non-content columns as "significant" and "insignificant."

According to one embodiment, a "significant" cluster of non-content columns corresponds to a space between content regions in a header of a document, such as a space between graphics and supplier regions, between an invoice number and an invoice date, between a supplier region and a recipient region, or between a document title and a recipient region. In this embodiment, an "insignificant" group of non-content columns corresponds to a space between characters in a word, or a space between words in a set of words, such as words in an address, a document title, or a graphic element.

A mask generation engine 116 generates a mask for the electronic document based on the grouped significant non-content clusters. For example, for each content slice, the system identifies the boundaries of the "significant" clusters and the boundaries of the content slice. The mask generation engine 116 combines the background regions defined by the "significant" clusters and non-content slices to generate a background mask of the electronic document 121. The mask generation engine 116 identifies the boundaries of content regions within the electronic document 121 based on the boundaries of the background mask.

The document region classification engine 110 stores the document mask 123 together with the electronic document 121 in the data repository 120. The semantic content analysis engine 130 obtains the electronic document 121 and the document mask 123 to extract semantic content from foreground regions specified by the document mask 123

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the document region classification engine 110. Alternatively, or additionally, a data repository 120 may be implemented or executed on a computing system separate from the document region classification engine 110. A data repository 120 may be communicatively coupled to the document region classification engine 110 via a direct connection or via a network.

Information describing electronic documents 121, custom slice classification thresholds 122, and document masks 123 may be implemented across any of components within the system 100. However, this information is illustrated within the data repository 120 for purposes of clarity and explanation.

In one or more embodiments, the document region classification engine 110 refers to hardware and/or software configured to perform operations described herein for identifying foreground regions in an electronic document by clustering background regions in the electronic document. Examples of operations for identifying foreground regions in an electronic document by clustering background regions in the electronic document are described below with reference to FIGS. 2A-2D.

In an embodiment, the document region classification engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 117 refers to hardware and/or software configured to facilitate communications between a user and the document region classification engine 110. For example, a user may set or modify one or more thresholds of the pixel classification engine 111, the row classification engine 112, the slice classification engine 113, the column classification engine 114, and the column group classification engine 115 via the user interface 117. Interface 117 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 117 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 117 is specified in one or more other languages, such as Java, C, or C++.

3. Clustering Background Regions in a Document to Identify Foreground Regions

FIGS. 2A-2D illustrate an example set of operations for identifying and grouping foreground regions in a document based on clustering background regions in the document, in accordance with one or more embodiments. One or more operations illustrated in FIGS. 2A-2D may be modified, rearranged, or omitted all together. Accordingly, the particular sequence of operations illustrated in FIGS. 2A-2D should not be construed as limiting the scope of one or more embodiments.

A system classifies pixels in an electronic document as background pixels and foreground pixels (Operation 202). According to one embodiment, the system converts grayscale or color documents into black and white documents, where white represents a background pixel and black represents a foreground pixel. According to one embodiment, a system may identify an average shading value of all the pixels in a document, or in a portion of a document. The system may compare each pixel to the average to identify the pixel as a foreground pixel or a background pixel. As another example, the system may set all pixel values below a certain threshold to black and all values above the threshold to white. The threshold value can be chosen manually or automatically based on the image content. According to another example, a system may convert a document into grayscale by averaging the red, green, and blue color channels. The system may convert the resulting grayscale image into a black-and-white image by comparing the grayscale values for the pixels to threshold values. According to yet another example, the system may dynamically calculate a threshold value for converting each pixel to a black or white pixel based on attributes of the surrounding pixels.

The system analyzes rows of pixels in the electronic document to identify the rows as content rows or non-content rows (Operation 204). According to one embodiment, a row of pixels includes all the pixels extending from one edge to another edge of the electronic document. In an example in which a document is aligned for reading, the row extends from a left edge of the document to the right edge of the document. The system compares a percentage of background pixels in a row of pixels to a threshold value (Operation 206). For example, the threshold value may be set at 95%. In this example, if a percentage of background pixels within the row of pixels is 95% or more, the system classifies the row as a non-content row (Operation 208). If a percentage of background pixels within the row of pixels is less than 95%, the system classifies the row as a content row (Operation 210). According to one or more embodiments, the threshold is a value between 95% and 97%. For example, the threshold may be 95%, 96%, or 97%. According to one or more embodiments, the system does not set the threshold at 100%. The system iteratively classifies rows of pixels as content rows and non-content rows until each row in a predefined portion of an electronic document has been classified. For example, the system may classify each row in an entire electronic document. Alternatively, the system may classify each row in a portion of an electronic document identified as a header of the electronic document. According to another alternative embodiment, the system may classify each row in an upper half of the document.

The system determines whether an additional row of pixels exists in the electronic document, or in a portion of the electronic document under analysis (Operation 212). If additional rows exist, the system selects an additional row for classification (Operation 214). The system iteratively classifies rows in the electronic document, or in the portion of the electronic document under analysis, until each row in the electronic document has been classified.

Figure 2A:
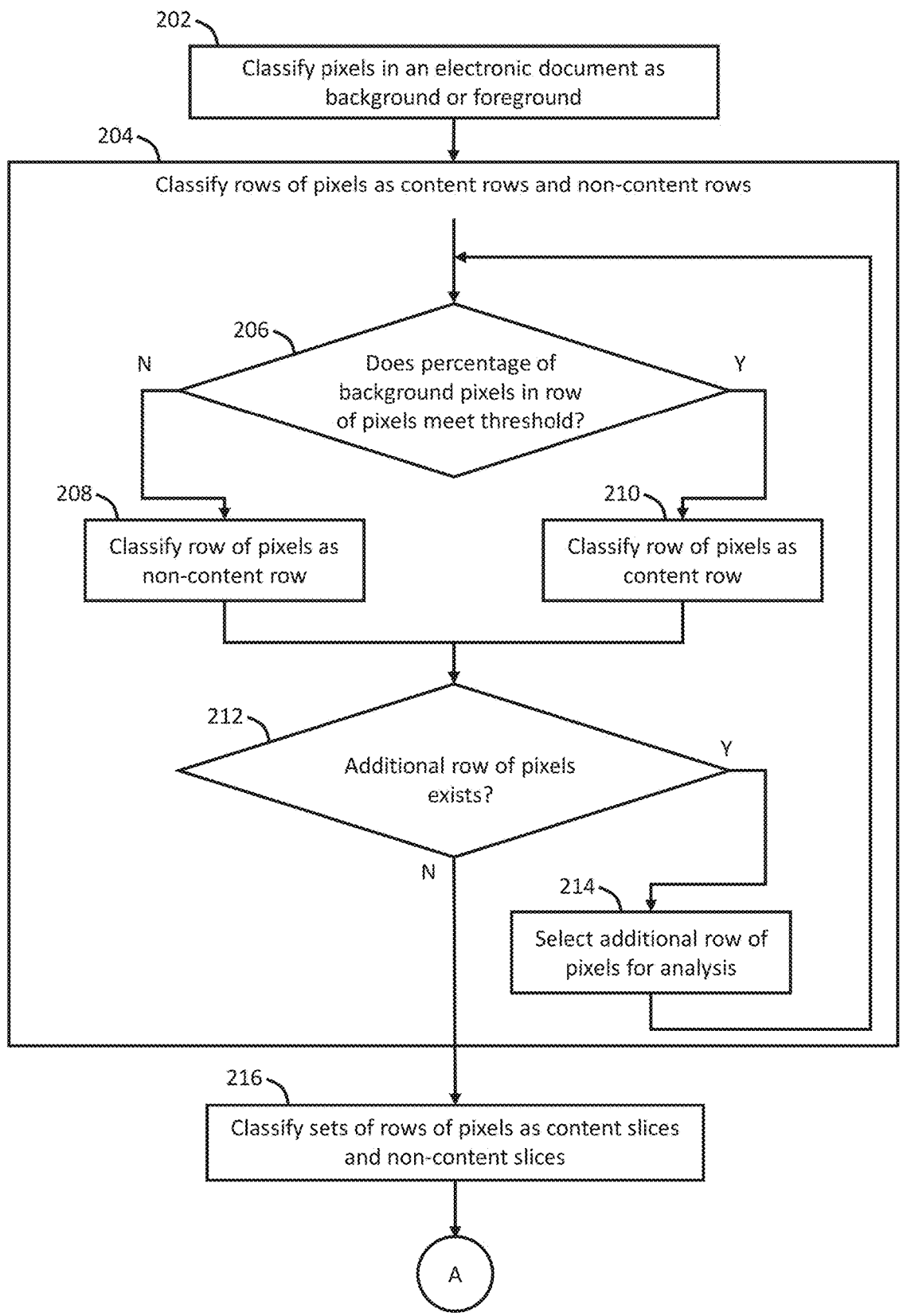
FIG. 2A-2D illustrate an example set of operations for identifying background regions and foreground regions in an electronic document in accordance with one or more embodiments.
Figure 2B:
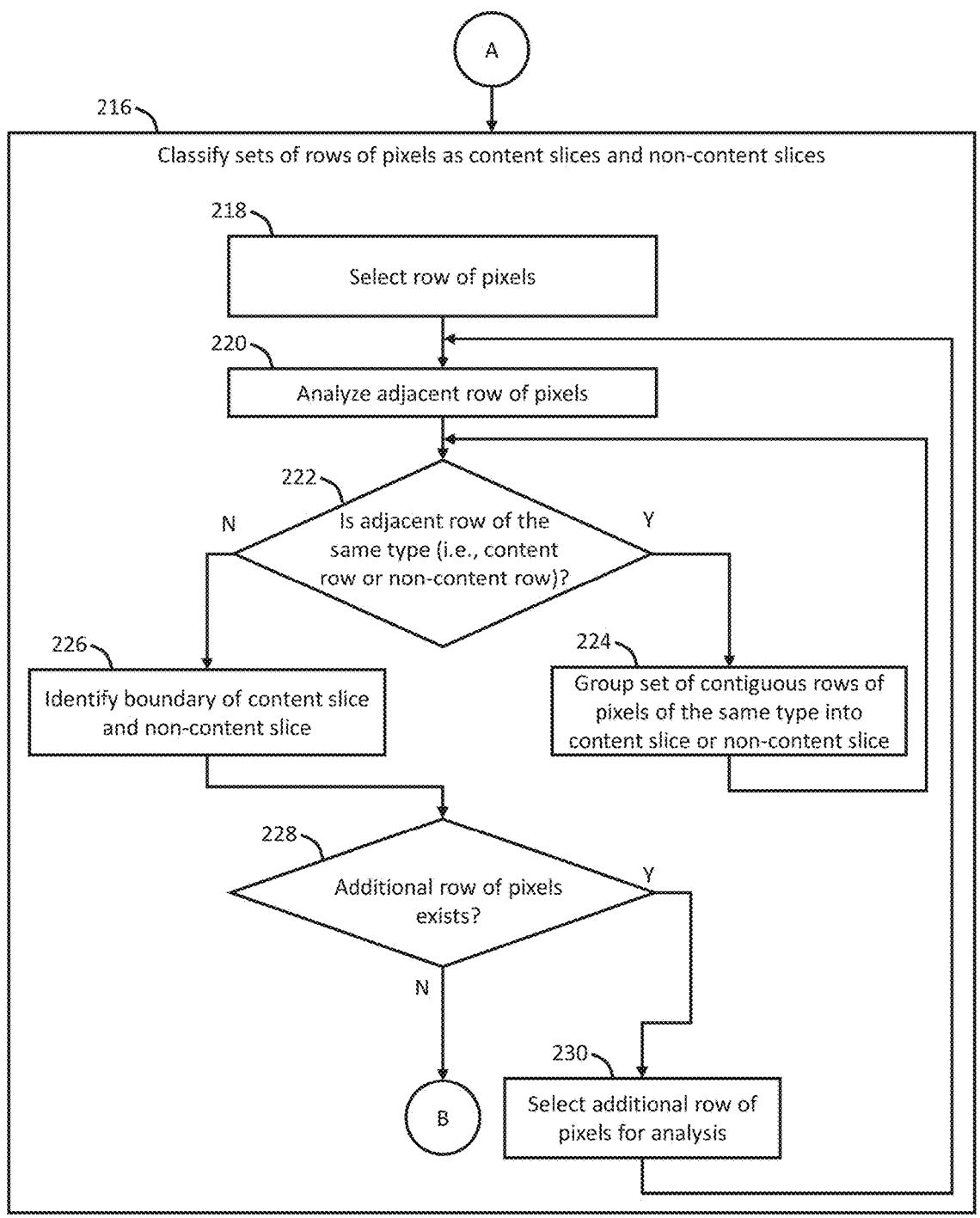

Once each row of pixels has been classified as a content row or non-content row, the system classifies sets of rows of pixels as horizontal content slices or horizontal non-content slices (Operation 216). Referring to FIG. 2B, the system selects a row of pixels having been classified as a content row or a non-content row (Operation 218). The system analyzes an adjacent row of pixels (Operation 220). For example, the system may sequentially analyze each horizontal row of pixels in a direction from a top of a document to a bottom of a document. Alternatively, the system may sequentially analyze each row of pixels in a direction from a bottom of the document to the top of the document.

The system determines whether the adjacent row of pixels is the same classification type as the selected row of pixels (Operation 222). For example, if the selected row of pixels is a content row, the system determines whether the row immediately below the selected row is also a content row. As another example, if the selected row of pixels is a non-content row, the system determines whether the row immediately below the selected row is also a non-content row.

If the adjacent row of pixels is of the same type as the selected row, the system groups the rows of pixels into the same horizontal slice—either a content slice or a non-content slice (Operation 224). A horizontal slice is a set of one or more rows of pixels of the same classification type. Each slice, other than a slice at an upper or lower edge of a document, is bounded on its upper side and lower side by a slice of an opposing type. For example, a horizontal content slice is made up of a set of adjacent content rows of pixels with a non-content row bordering the bottom-most content row, and a non-content row bordering the top-most content row. Likewise, a horizontal non-content slice is made up of a set of adjacent non-content rows of pixels with a content row bordering the bottom-most non-content row, and a content row bordering the top-most non-content row.

If the adjacent row of pixels is of a different type (e.g., a non-content row adjacent to a content row), the system identifies the boundary of a horizontal slice (Operation 226). For example, if the selected row of pixels is a content row, and if the system identifies the adjacent row of pixels as a non-content row, the system identifies the content row as being the boundary row of a content slice. A horizontal slice may be as narrow as one row of pixels. For example, the system may select a non-content row and identify a content row as being adjacent to the non-content row. The system identifies the non-content row as being the lower end of a non-content slice of non-content rows. The system next selects the content row and identifies a non-content row as being adjacent to the content row on a lower side. The system identifies the content row as being the lower end of a content slice, which makes the content row the only row in a horizontal content slice.

According to an alternative embodiment, the system identifies two or more rows as making up a horizontal slice. For example, the system may select a non-content row and identify a first content row as being adjacent to the non-content row. The system identifies the non-content row as being the lower end of a non-content slice of non-content rows. The system next selects the first content row and identifies a second content row as being adjacent to the selected first content row on a lower side. The system groups the adjacent first and second content rows as being part of the same content slice. The system next selects the second content row and identifies another, third, content row as being adjacent to the selected second content row on a lower side. The system groups the adjacent first, second, and third content rows as being part of the same content slice. The system selects the third content row and identifies a non-content row as being adjacent to the third content row on its lower side. The system identifies the third content row as being the lower end of the content slice. The system continues the row-by-row analysis to identify adjacent non-content rows that make up a non-content slice.

Upon identifying a row of pixels as a lower boundary of a horizontal slice of a particular type, the system determines whether additional rows of pixels exist to be analyzed (Operation 228). For example, if the system is performing a row-by-row analysis from a top of a document to a bottom of the document, the system determines whether it has reached the bottom-most row of the document, or of the portion of the document to be analyzed. If an additional row of pixels exists, the system selects the additional row for analysis to group the row with a horizontal slice (Operation 230). As a result, an electronic document, or a portion of an electronic document, is divided into alternating horizontal slices of content slices and non-content slices, where each slice comprises one or more horizontal rows of pixels that are classified as content rows or non-content rows, respectively.

Figure 2C:
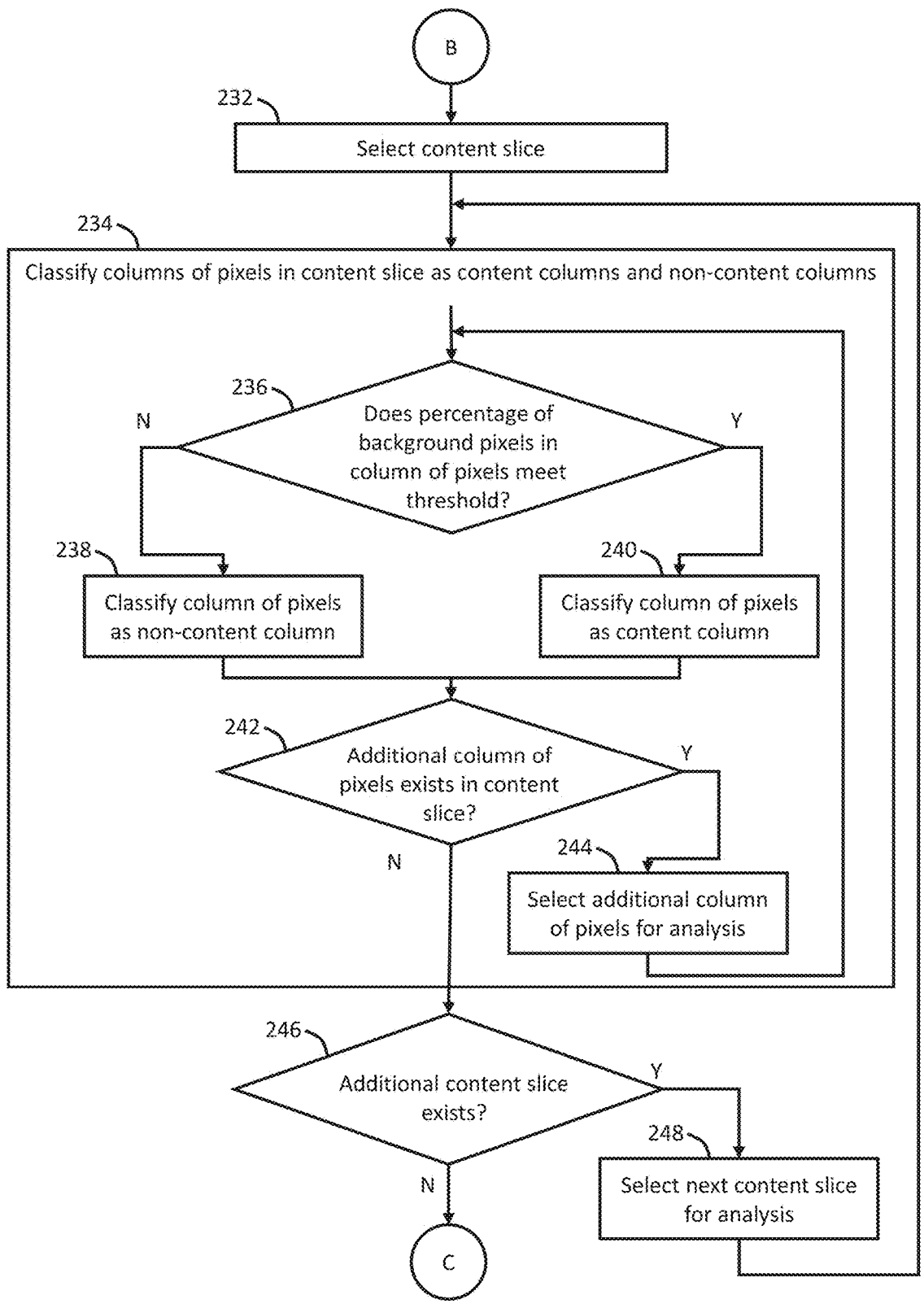
Figure 2D:
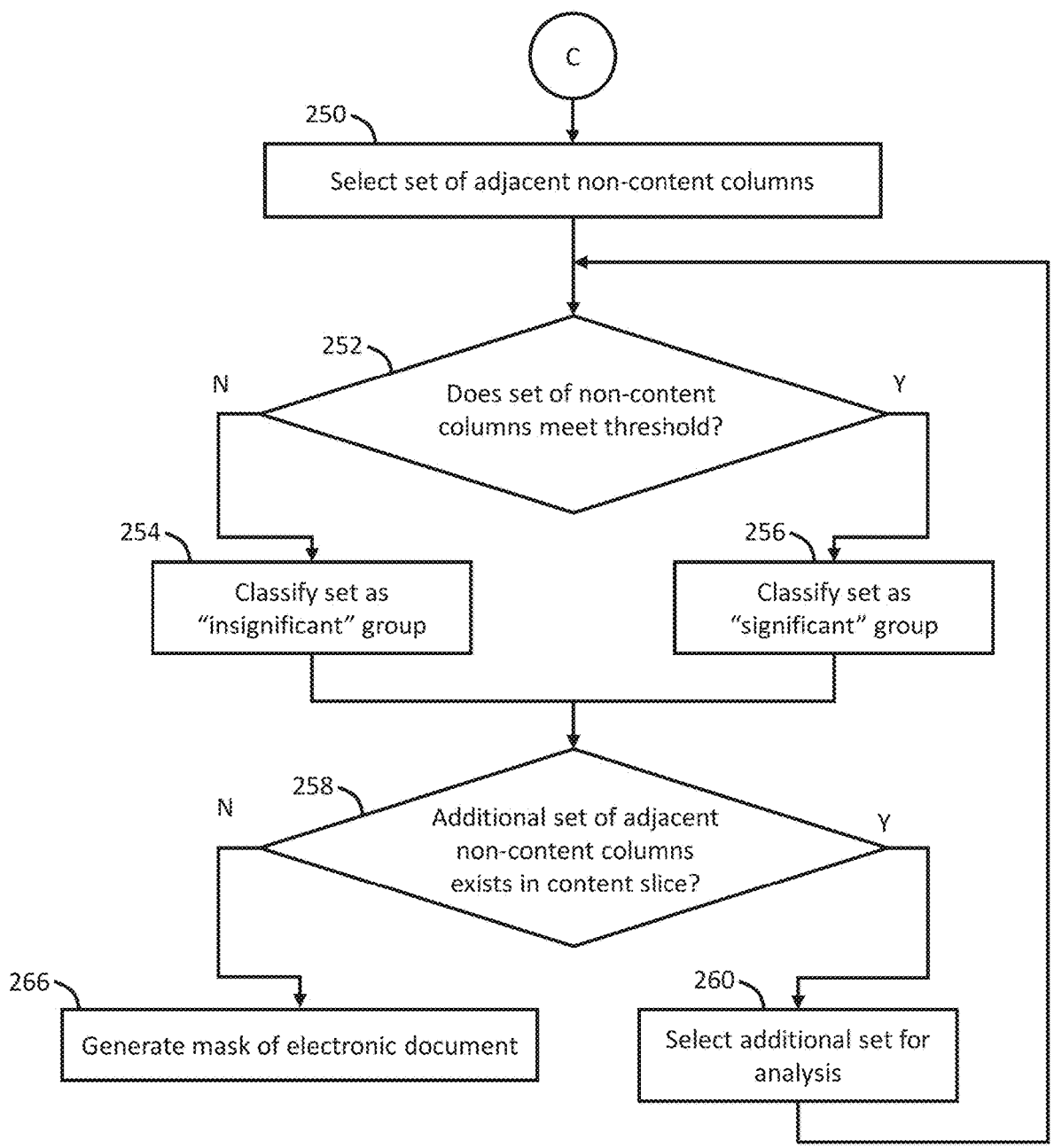

Referring to FIG. 2C, the system selects a content slice for analysis (Operation 232). The system analyzes each content slice in an electronic document, or in a portion of the electronic document under analysis, to classify columns of pixels in each slice as content columns and non-content columns (Operation 234).

For each column, the system determines whether a percentage of pixels in the column meets a threshold (Operation 236). If a percentage of background pixels in the column within a particular content slice meets a threshold, the system classifies the column as a non-content column (Operation 238). If the percentage of background pixels in the column within the content slice does not meet the threshold, the system classifies the column as a content column (Operation 240). The threshold for classifying columns of pixels may be the same as, or different from, the threshold for classifying rows of pixels. In one embodiment, the system calculates an average background pixel percentage across all columns in a horizontal slice. Accordingly, the threshold for classifying columns as non-content columns may vary by horizontal slice, depending upon the respective average background pixels percentages of the respective horizontal slices. According to one embodiment, the threshold for classifying a column as a non-content column is much smaller than the threshold used to classify a row of pixels as a non-content row. For example, the system may classify a row as a non-content row based on determining the percentage of background pixels in the row is 95% or greater. In contrast, the system may classify a column of a content slice as a non-content column based on determining the percentage of background pixels in the column is 50% or greater. In one or more embodiments, the threshold for classifying a column of pixels of a content slice as a non-content column is at least 10% lower than the threshold for classifying a row of pixels as a non-content row.

According to one example, a system may classify rows of pixels as non-content rows in Operation 206 based on determining the row includes 70% or more background pixels. In contrast, the system may classify a column of pixels within a slice as a non-content column in Operation 236 based on determining the column includes 50% or more background pixels.

Upon classifying a column of pixels as a content column or a non-content column, the system determines whether additional columns exist in the same horizontal content slice (Operation 242). For example, the system may analyze each column in a content slice in a right-to-left horizontal direction, or in a left-to-right horizontal direction. If another column of pixels exists, which has not yet been classified, in the content slice, the system selects the next column for analysis (Operation 244). According to one or more embodiments, the system assigns a binary value to a column of pixels based on whether the column is classified as a content column or a non-content column. For example, the system may assign a "1" to a column classified as a content column and a "0" to a column classified as a non-content column. As a result, each content slice may be represented as a binary string. For example, a portion of a content slice which includes five adjacent non-content columns, ten adjacent content columns, one non-content column, then two content columns, may be represented as: " . . . 0, 0, 0, 0, 0, 1, 1, 1, 1, 1, 1, 1, 1, 1, 1, 0, 1, 1, . . . "

Once each column in a particular horizontal content slice has been classified as a content column or a non-content column, the system determines whether an additional content slice exists in a document, or in a portion of a document being analyzed (Operation 246). For example, the system may analyze each content slice in a header of a document, in a vertical direction from a top of the document to the bottom of the document, or in a vertical direction from the bottom of the document to the top of the document. If another content slice exists, in which columns have not been classified, the system selects the next content slice for analysis (Operation 248).

In each horizontal content slice, the system analyzes groups of adjacent non-content columns to classify the groups as significant or insignificant. In particular, the system selects a particular set of adjacent non-content columns (Operation 250). A set may include a single non-content column that is surrounded on each side by content columns, or by a content column and an edge of the content slice. As an example, a portion of a content slice may be represented by a binary string: 0, 0, 0, 0, 1, 1, 1, 1, 1, 1, 1, 1, 0, 1, 1, 1, 1, 1, 1, 0, 1, 1, 1, 1, 1, 1, 0, 0, 0, 0, 1, 1, . . . . The system selects for analysis four sets of adjacent, or single, non-content columns: a four-columns set, a single column set, a single column set, and a four-column set.

The system determines whether the set of adjacent, or single, non-content columns meets a threshold (Operation 252). The threshold may correspond to a number greater than one. For example, the threshold may be set at "3." If a number of non-content columns in the selected set meets the threshold, the system groups the set of columns and classifies the grouping as "significant" (Operation 256). If a number of non-content columns in the selected set does not meet the threshold, the system groups the set of columns and classifies the grouping as "insignificant" (Operation 254).

According to one embodiment, the system dynamically sets a threshold for each content slice according to characteristics of the respective content slice. For example, the system may assign one threshold to one content slice characterized by one pattern of non-content columns. The system assigns a different threshold to another content slice characterized by another pattern of non-content columns. The system assigns a particular threshold to a particular content slice by (a) generating a set of values corresponding to numbers of columns in each set of adjacent non-content columns, or solitary non-content columns surrounded by content columns, in a content slice, (b) calculating a mean of the set of values, (c) fitting a normal distribution on the set of values, and (d) selecting a threshold for a content slice based on the normal distribution. For example, the system may select a threshold for a content slice based on one standard deviation from the mean. Alternatively, the system may select a threshold for a content slice based on two standard deviations from the mean. Since two content slices may have different mean values for non-content groupings, different content slices may be assigned different threshold values for classifying groups of non-content columns as "significant" and "insignificant."

According to one embodiment, a "significant" group of non-content columns corresponds to a space between content regions in a header of a document, such as a space between graphics and supplier regions, between an invoice number and an invoice date, between a supplier region and a recipient region, or between a document title and a recipient region. In this embodiment, an "insignificant" group of non-content columns corresponds to a space between characters in a word, or a space between words in a set of words, such as words in an address, a document title, or a graphic element.

Once a set of adjacent non-content columns, or a solitary non-content column surrounded by content columns, has been classified as "significant" or "insignificant," the system determines whether another set of adjacent non-content columns, or solitary non-content columns, exists in a content slice (Operation 258). If another set of adjacent non-content columns, or a solitary non-content column surrounded by content columns, exists, the system selects the next set for analysis (Operation 260).

The system generates a mask for the electronic document based on the grouped significant non-content regions (Operation 266). For example, the system may identify boundaries of (a) significant non-content regions within each content slice, and (b) non-content slices to generate a mask specifying boundaries of content regions in the electronic document. The system determines location information of the content regions by mapping coordinates of the electronic document to the content regions. The system may store the mask associated with the electronic document for use in a downstream analysis process. For example, a machine learning model may identify semantic content in the electronic document by extracting text and/or graphics from the regions mapped as content regions in the electronic document by the mask.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

FIGS. 3A-3G illustrate an example embodiment of identifying content regions, or regions of semantic significance, in an invoice header, without analyzing distances between foreground content and without analyzing semantic content in the foreground regions.

Figure 3A:

Referring to FIG. 3A, a system obtains an invoice 300. The system creates a background projection profile of the invoice. The system converts the grayscale content in the invoice 300 into black and white pixels, where white represents a background pixel and black represents a foreground pixel. The system identifies an average shading value of all the pixels in a document. The system compares each pixel to the average to classify the pixel as a foreground pixel or a background pixel.

The system analyzes rows of pixels in the invoice 300 to identify the rows as content rows or non-content rows. For each row of pixels, the system determines whether a percentage of background pixels is at least 97%. If the percentage of background pixels is at least 97%, the system classifies the row of pixels as a non-content row.

The system classifies sets of rows of pixels as horizontal content slices 302 or horizontal non-content slices 301. Based on the classification of rows of pixels as content rows and non-content rows, the system groups together sets of adjacent content rows and non-content rows. Groups of adjacent content rows are grouped into content slices 302. Groups of adjacent non-content rows are grouped into non-content slices 301.

Figure 3C:
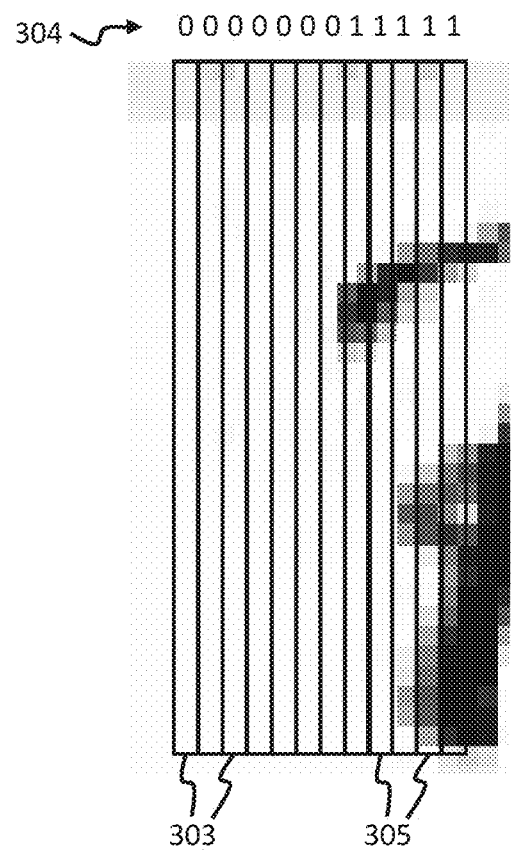
Figure 3D:
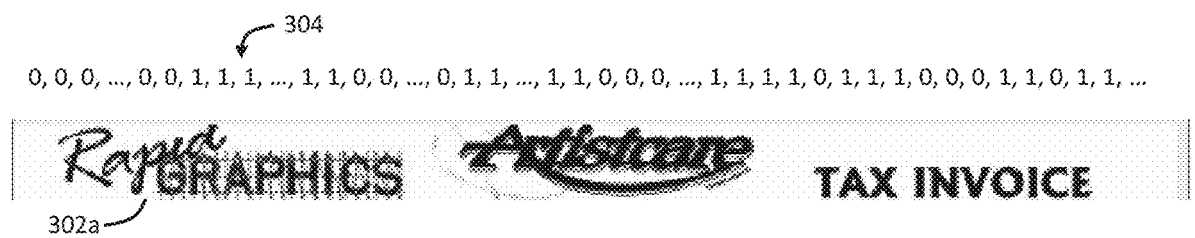

Referring to FIG. 3C, the system analyzes columns of pixels in each content slice 302 to identify the columns as content columns 305 or non-content columns 303. First, the system calculates the average percentage of background pixels in all the columns in the slice 302. Based on determining the average percentage of background pixels is 70%, the system compares the percentage of background pixels in each column to the threshold, 70%. If the percentage of background pixels is at least 70%, the system classifies the column of pixels as a non-content column 303. Otherwise, the system classifies the column as a content column 305. The system generates a binary string 304 for each content slice based on the classifications of the columns in the content slice. FIG. 3D illustrates a content slice 302a and a corresponding binary representation 304 of the content slice 302a, where the ellipses represent sequences of binary values which are omitted from FIG. 3D for purposes of clarity in depicting the binary string 304.

Figure 3E:
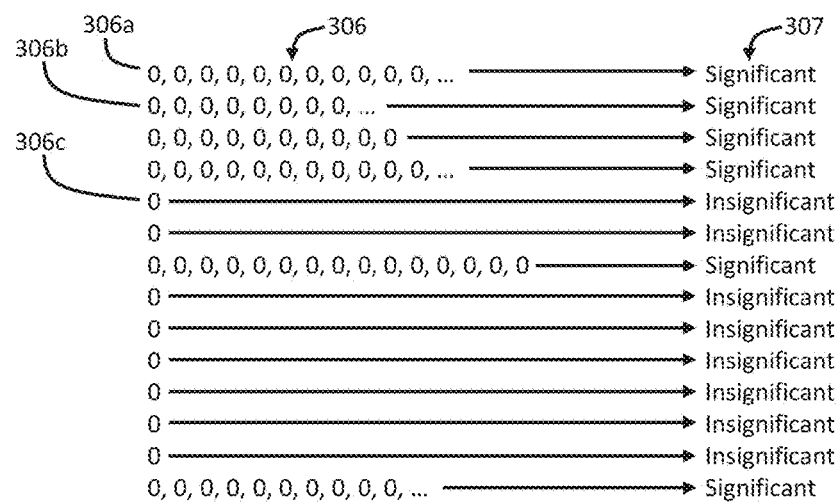

Referring to FIG. 3E, the system identifies each group of adjacent non-content, or background, columns 306 in slice 302a. Based on a mean number of columns in the groups 306, the system calculates a threshold for classifying the columns as "significant" or "insignificant." For example, a first group of columns 306a is made up of fifty adjacent background columns. A second group 306b is made up of forty adjacent background columns. Another group 306c, corresponding to a single column between the characters "T" and "A", is made up of a single column. The system calculates a mean of the set of values representing the number of columns in each group 306. For example, if a first group includes fifty columns, a second group includes forty background columns, a third group includes thirty background columns, a fourth group includes seventy background columns, a fifth group includes a single background column, and so on, the system calculates the mean of the set of values including: [50, 40, 30, 70, 1, . . . ]. The system fits a normal distribution on the set of values. The system calculates a threshold for classifying a group of background columns as "significant" or "insignificant" based on calculating two standard deviations from the mean. The system compares a number of background columns in each group 306 to the threshold to generate classifications 307 for each group.

The system may select a threshold for a content slice based on one standard deviation from the mean. Alternatively, the system may select a threshold for a content slice based on two standard deviations from the mean. Since two content slices may have different mean values for non-content groupings, different content slices may be assigned different threshold values for classifying groups of non-content columns as "significant" and "insignificant.".

According to one embodiment, a "significant" group of non-content columns corresponds to a space between content regions in a header of a document, such as a space between graphics and supplier regions, between an invoice number and an invoice date, between a supplier region and a recipient region, or between a document title and a recipient region. In this embodiment, an "insignificant" group of non-content columns corresponds to a space between characters in a word, or a space between words in a set of words, such as words in an address, a document title, or a graphic element.

Figure 3F:
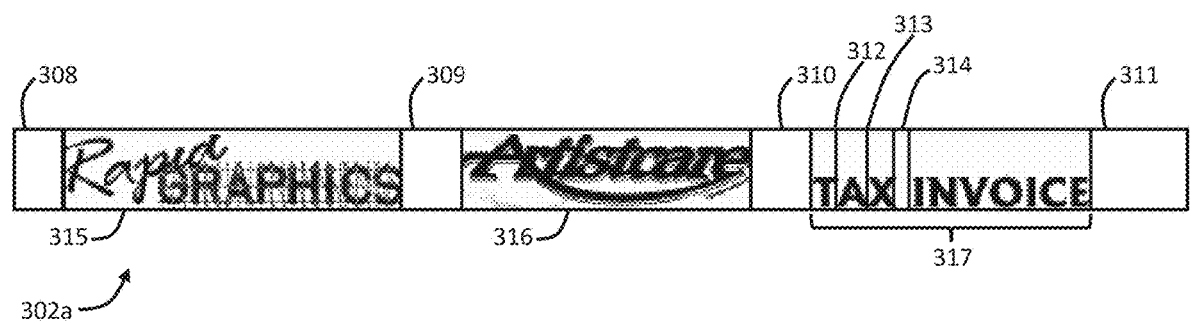

Referring to FIG. 3F, the system clusters columns into content clusters 315, 316, and 317 and non-content, or background, clusters 308, 309, 310, and 311 based on the classifications of the groups of columns as "significant" or "insignificant." For example, based on the comparison of the number of columns in the groups 312, 313, and 314 with the threshold, the system determines these groupings of background columns are "insignificant." Accordingly, these groupings are considered part of the content cluster 317, rather than distinct background clusters. Based on comparing the number of background columns in the clusters 308-311 with the threshold, the system determined these regions were "significant." Accordingly, the system clusters the columns in these regions into distinct non-content clusters 308-311, rather than including the groups as part of content clusters.

Figure 3G:
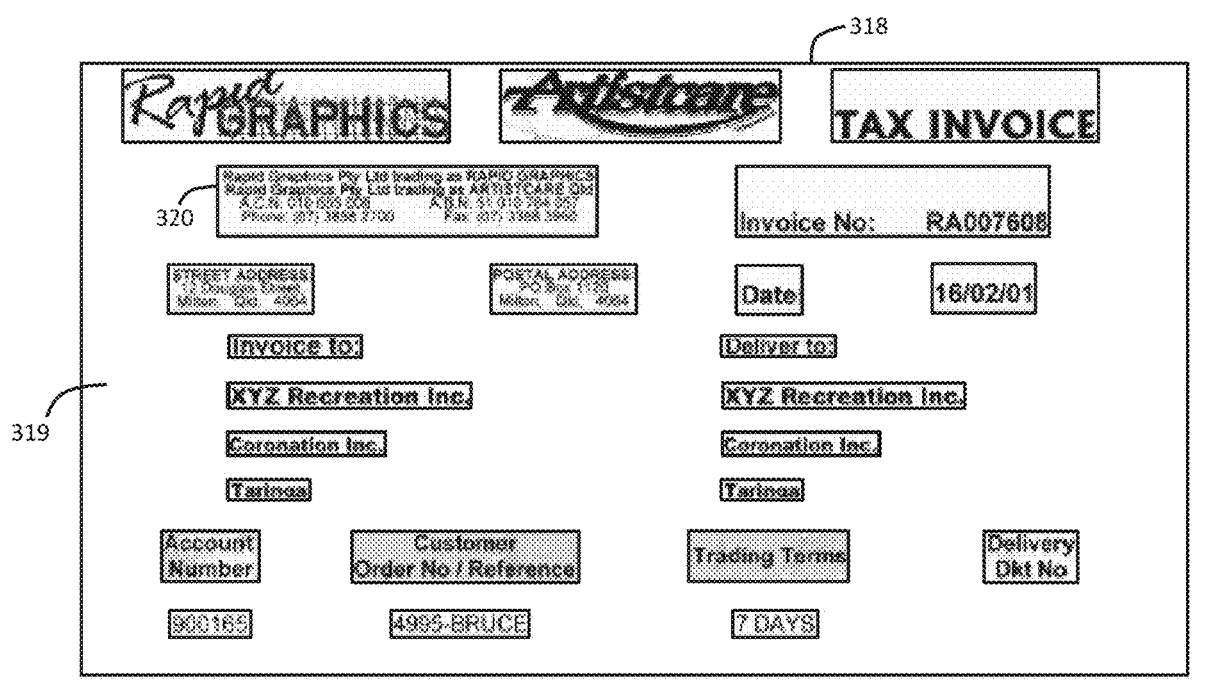

Referring to FIG. 3G, the system generates a mask 318 for the electronic document based on the grouped background clusters. The system combines the background clusters of the content slices, such as the background clusters 308-311 of the content slice 302a with the non-content slices 301 to generate a composite background region 319 of the mask. Based on the boundaries of the composite background region 319, the system identifies content regions 320. The system overlays the mask 318 onto the electronic document to obtain location information, such as coordinate information, of the boundaries of the content regions 320. The system may store the mask 318 associated with the electronic document for use in a downstream analysis process, such as semantic content extraction for semantic analysis.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
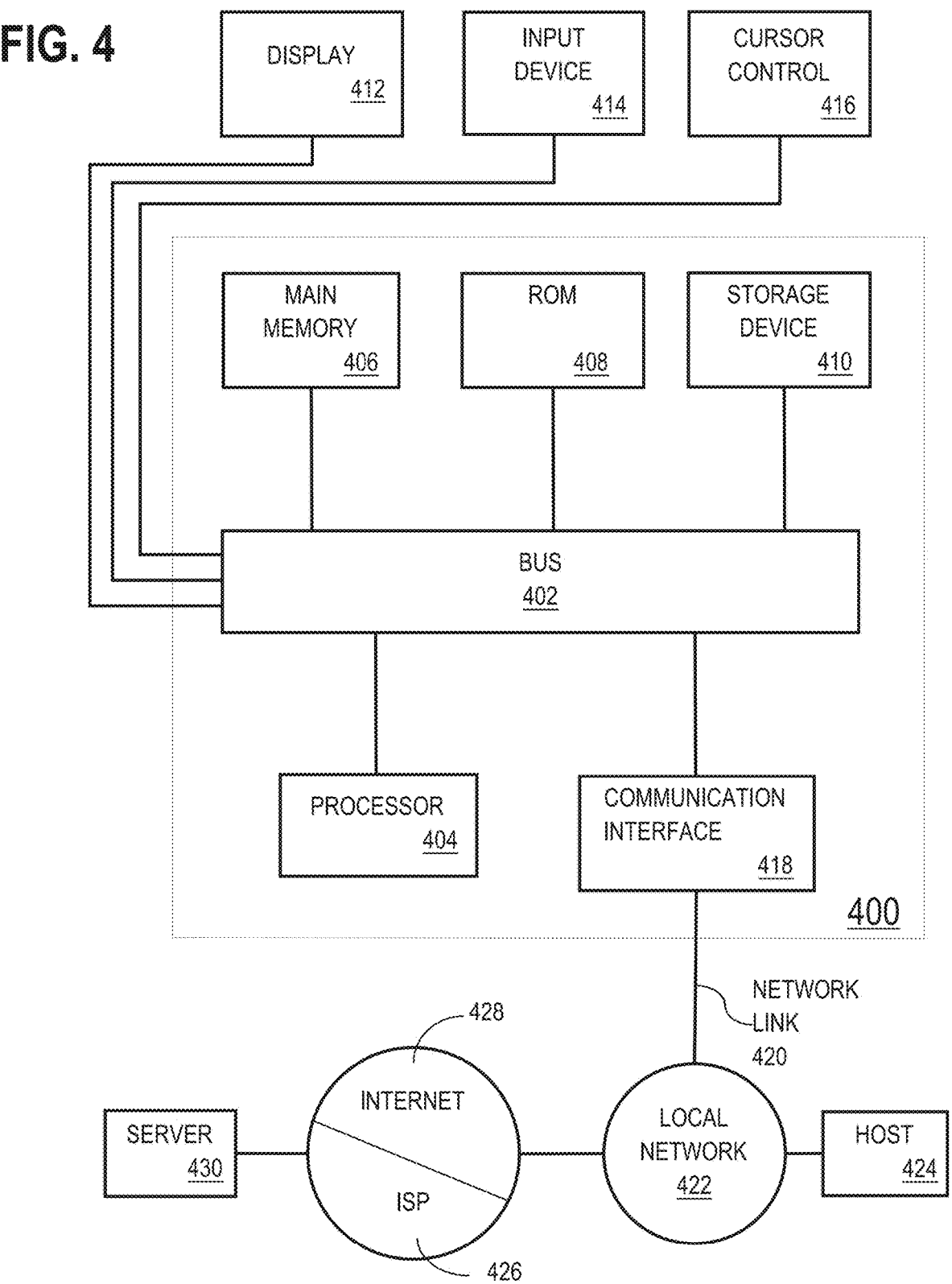
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
   identifying a plurality of slices in an electronic document, each slice comprises one or more rows of pixels, wherein identifying the plurality of slices comprises identifying a first slice comprising a first set of one or more rows of pixels in an electronic document;
identifying a plurality of background regions of the plurality of slices in the electronic document, at least by iteratively:
  generating a binary encoding for each slice in the plurality of slices to generate a plurality of binary encodings; and
  clustering sets of columns comprised in each slice of the plurality of slices to generate the plurality of background regions, wherein identifying the plurality of background regions comprises identifying a first background region, at least by:
    generating a binary encoding of the first slice by assigning a binary value to each column of pixels in the first slice, at least by:
      for each column of pixels in the first slice, comparing a number of background pixels to a first threshold;
      based on determining a first number of background pixels in a first column of pixels in the first slice is at least equal to or greater than the first threshold: assigning a first binary value to the first column of pixels; and
      based on determining a second number of background pixels in a second column of pixels in the first slice fails to meet the first threshold: assigning a second binary value to the second column of pixels; and
    clustering a first set of columns of pixels, comprised in the first slice, into a first background region based on determining (a) the first set of columns is a set of horizontally-contiguous columns, (b) the first set of columns correspond to a same binary value representing a background, and (c) a number columns in the first set of columns exceeds a second threshold;
selecting a space defined by the first background region for inclusion in a document mask corresponding to a background region of the electronic document;
mapping boundaries of the plurality of background regions to coordinates in the electronic document; and
generating the document mask differentiating one or more foreground regions in the electronic document from the plurality of background regions based on the mapping.

2. The non-transitory computer readable medium of claim 1, wherein the operations further comprise:
including a second set of columns of pixels, comprised in the first slice, in a first foreground region based on determining (a) the second set of columns is a set of horizontally-contiguous columns, (b) the second set of columns correspond to a same binary value representing a background, and (c) a number columns in the second set of columns does not exceed the second threshold.

3. The non-transitory computer readable medium of claim 1, wherein the second threshold corresponds to a standard deviation of a normal distribution of background columns in the first slice.

4. The non-transitory computer readable medium of claim 1, wherein the operations further comprise:
calculating the first threshold based on an average percentage of background pixels in all of the columns of pixels in the first slice.

5. The non-transitory computer readable medium of claim 1, wherein the operations further comprise:

identifying a plurality of content slices in the electronic document, wherein each content slice comprises a respective set of one or more rows of pixels in which a percentage of background pixels meets a third threshold;
calculating a plurality of custom second thresholds for the plurality of content slices based on a distribution of background columns of pixels in the respective plurality of content slices.

6. The non-transitory computer readable medium of claim 1, wherein the operations further comprise:
identifying a plurality of groups of background columns in the first slice;
fitting a normal distribution to the groups of background columns; and
calculating the second threshold based on a standard deviation corresponding to the normal distribution.

7. The non-transitory computer readable medium of claim 1, wherein the operations further comprise:
classifying a first row of pixels as a non-content row based on determining a percentage of background pixels in the first row meets a third threshold;
classifying a second row of pixels as a content row based on determining a percentage of background pixels in the second row does not meet the third threshold;
based on classifying the first row of pixels as a non-content row, including the first row of pixels in the first slice; and
based on classifying the second row of pixels as a content row, excluding the second row of pixels from the first slice.

8. The non-transitory computer readable medium of claim 1, wherein the operations further comprise:
determining a set of characteristics for classifying background pixels at least by:
  identifying at least one of a shade and a color of each pixel in the electronic document;
  generating an average value for the electronic document based on the at least one of the shade and the color of each pixel in the electronic document; and
  generating a particular value for each respective pixel in the electronic document based on the average value for the electronic document;
classifying pixels, for each column of pixels, in the first slice as background pixels or foreground pixels based on the characteristics.

9. A method comprising:
identifying a plurality of slices in an electronic document, each slice comprises one or more rows of pixels, wherein identifying the plurality of slices comprises identifying a first slice comprising a first set of one or more rows of pixels in an electronic document;
identifying a plurality of background regions of the plurality of slices in the electronic document, at least by iteratively:
  generating a binary encoding for each slice in the plurality of slices to generate a plurality of binary encodings; and
  clustering sets of columns comprised in each slice of the plurality of slices to generate the plurality of background regions, wherein identifying the plurality of background regions comprises identifying a first background region, at least by:
    generating a binary encoding of the first slice by assigning a binary value to each column of pixels in the first slice, at least by:

for each column of pixels in the first slice, comparing a number of background pixels to a first threshold;

based on determining a first number of background pixels in a first column of pixels in the first slice is at least equal to or greater than the first threshold: assigning a first binary value to the first column of pixels; and based on determining a second number of background pixels in a second column of pixels in the first slice fails to meet the first threshold: assigning a second binary value to the second column of pixels; and clustering a first set of columns of pixels, comprised in the first slice, into a first background region based on determining (a) the first set of columns is a set of horizontally-contiguous columns, (b) the first set of columns correspond to a same binary value representing a background, and (c) a number columns in the first set of columns exceeds a second threshold;

selecting a space defined by the first background region for inclusion in a document mask corresponding to a background region of the electronic document;

mapping boundaries of the plurality of background regions to coordinates in the electronic document; and generating the document mask differentiating one or more foreground regions in the electronic document from the plurality of background regions based on the mapping.

10. The method of claim 9, further comprising:
clustering a second set of columns of pixels, comprised in the first slice, into a first foreground region based on determining (a) the second set of columns is a set of horizontally-contiguous columns, (b) the second set of columns correspond to a same binary value representing a background, and (c) a number columns in the second set of columns does not exceed the second threshold.

11. The method of claim 9, wherein the second threshold corresponds to a standard deviation of a normal distribution of groups of background columns in the first slice.

12. The method of claim 9, further comprising:
identifying a plurality of content slices in the electronic document, wherein each content slice comprises a respective set of one or more rows of pixels in which a percentage of background pixels meets a third threshold;
calculating a plurality of custom second thresholds for the plurality of content slices based on a distribution of background columns of pixels in the respective plurality of content slices.

13. The method of claim 9, further comprising:
identifying a plurality of groups of background columns in the first slice;
fitting a normal distribution to the groups of background columns; and
calculating the second threshold based on a standard deviation corresponding to the normal distribution.

14. The method of claim 9, further comprising:
classifying a first row of pixels as a non-content row based on determining a percentage of background pixels in the first row meets a third threshold;
classifying a second row of pixels as a content row based on determining a percentage of background pixels in the second row does not meet the third threshold;

based on classifying the first row of pixels as a non-content row, including the first row of pixels in the first slice; and based on classifying the second row of pixels as a content row, excluding the second row of pixels from the first slice.

15. The method of claim 9, further comprising:
determining a set of characteristics for classifying background pixels at least by:
identifying at least one of a shade and a color of each pixel in the electronic document;
generating an average value for the electronic document based on the at least one of the shade and the color of each pixel in the electronic document; and
generating a particular value for each respective pixel in the electronic document based on the average value for the electronic document;
classifying pixels, for each column of pixels, in the first slice as background pixels or foreground pixels based on the characteristics.

16. A system comprising:
one or more processors; and
memory storing instructions that, when executed by the one or more processors, cause the system to perform operations comprising:
identifying a plurality of slices in an electronic document, each slice comprises one or more rows of pixels, wherein identifying the plurality of slices comprises identifying a first slice comprising a first set of one or more rows of pixels in an electronic document;
identifying a plurality of background regions of the plurality of slices in the electronic document, at least by iteratively:
generating a binary encoding for each slice in the plurality of slices to generate a plurality of binary encodings; and
clustering sets of columns comprised in each slice of the plurality of slices to generate the plurality of background regions, wherein identifying the plurality of background regions comprises identifying a first background region, at least by:
generating a binary encoding of the first slice by assigning a binary value to each column of pixels in the first slice, at least by:
for each column of pixels in the first slice, comparing a number of background pixels to a first threshold;
based on determining a first number of background pixels in a first column of pixels in the first slice is at least equal to or greater than the first threshold: assigning a first binary value to the first column of pixels; and
based on determining a second number of background pixels in a second column of pixels in the first slice fails to meet the first threshold: assigning a second binary value to the second column of pixels; and
clustering a first set of columns of pixels, comprised in the first slice, into a first background region based on determining (a) the first set of columns is a set of horizontally-contiguous columns, (b) the first set of columns correspond to a same binary value representing a background, and (c) a number columns in the first set of columns exceeds a second threshold;

selecting a space defined by the first background region for inclusion in a document mask corresponding to a background region of the electronic document;
mapping boundaries of the plurality of background regions to coordinates in the electronic document; and
generating the document mask differentiating one or more foreground regions in the electronic document from the plurality of background regions based on the mapping.

17. The system of claim 16, wherein the operations further comprise:
including a second set of columns of pixels, comprised in the first slice, in a first foreground region based on determining (a) the second set of columns is a set of horizontally-contiguous columns, (b) the second set of columns correspond to a same binary value representing a background, and (c) a number columns in the second set of columns does not exceed the second threshold.

18. The system of claim 16, wherein the second threshold corresponds to a standard deviation of a normal distribution of background columns in the first slice.

19. The system of claim 16, wherein the operations further comprise:
identifying a plurality of content slices in the electronic document, wherein each content slice comprises a respective set of one or more rows of pixels in which a percentage of background pixels meets a third threshold;
calculating a plurality of custom second thresholds for the plurality of content slices based on a distribution of background columns of pixels in the respective plurality of content slices.

20. The non-transitory computer readable medium of claim 1, wherein the operations further comprise:
masking the background in the electronic document using the document mask to generate a masked electronic document exposing foreground content corresponding to the one or more foreground regions;
providing the masked electronic document exposing the foreground content to a machine learning model; and
generating, by the machine learning model, a semantic analysis of the foreground content in the masked electronic document.

21. The non-transitory computer readable medium of claim 1, wherein the operations further comprise:

masking the background in the electronic document using the document mask to generate a masked electronic document exposing foreground content corresponding to the one or more foreground regions; and
extracting semantic content from the foreground content.

22. A non-transitory computer readable medium comprising instructions which, when executed by one or more hardware processors, causes performance of operations comprising:
identifying a slice comprising one or more rows of pixels in an electronic document;
generating a binary encoding of the slice by assigning a binary value to each column of pixels in the slice, at least by:
for each column of pixels in the slice, comparing a number of background pixels to a first threshold;
based on determining a first number of background pixels in a first column of pixels in the slice is at least equal to or greater than the first threshold: assigning a first binary value to the first column of pixels; and
based on determining a second number of background pixels in a second column of pixels in the slice fails to meet the first threshold: assigning a second binary value to the second column of pixels;
clustering a first set of columns of pixels, comprised in the slice, into a first background region based on determining (a) the first set of columns is a set of horizontally-contiguous columns, (b) the first set of columns correspond to a same binary value representing a background, and (c) a number columns in the first set of columns exceeds a second threshold;
selecting a space defined by the first background region for inclusion in a document mask corresponding to a background region of the electronic document;
generating the document mask including a plurality of background regions including the first background region;
masking the background in the electronic document using the document mask to generate a masked electronic document exposing foreground content corresponding to one or more foreground regions defined by boundaries of the background region; and
extracting semantic content from the foreground content.

\* \* \* \* \*